(12) United States Patent
Krishnappa et al.

(10) Patent No.: US 12,517,906 B2
(45) Date of Patent: Jan. 6, 2026

(54) EFFICIENT OPCODE-DRIVEN PIPELINED EXECUTION OF MULTI-LEVEL HASH JOINS

(71) Applicant: Oracle International Corporation, Redwood Shores, CA (US)

(72) Inventors: Chinmayi Krishnappa, San Mateo, CA (US); Weiwei Gong, Belmont, CA (US); Shasank Kisan Chavan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 65 days.

(21) Appl. No.: 18/412,409

(22) Filed: Jan. 12, 2024

(65) Prior Publication Data
US 2025/0231940 A1 Jul. 17, 2025

(51) Int. Cl.
*G06F 16/2453* (2019.01)
*G06F 16/22* (2019.01)
*G06F 16/2455* (2019.01)

(52) U.S. Cl.
CPC .... *G06F 16/24544* (2019.01); *G06F 16/2282* (2019.01); *G06F 16/2456* (2019.01)

(58) Field of Classification Search
CPC ............. G06F 16/2246; G06F 16/2282; G06F 16/2453; G06F 16/24544
USPC ........................................................ 707/714
See application file for complete search history.

(56) References Cited

U.S. PATENT DOCUMENTS

2003/0023960 A1* 1/2003 Khan .................. H04L 63/0823
717/152
2010/0293135 A1* 11/2010 Candea ............... G06F 16/2453
707/754

OTHER PUBLICATIONS

Hui-I Hsiao et al. "On Parallel Execution of Multiple Pipelined Hash Joins", ACM SIGMOD 94, pp. 185-196, May 1994 (Year: 1994) Parallel Exe. Pipelined Hash Joins (Year: 1994).*
Hui-I Haiso, "On Parallel Execu Tion of Multiple Pipelined Hash Joins" 1994 ACM SIGMOD, pp. 185-196 (Year: 1994).*

* cited by examiner

*Primary Examiner* — Shahid A Alam
(74) *Attorney, Agent, or Firm* — Hickman Becker Bingham Ledesma LLP; Stephen R. Tkacs

(57) ABSTRACT

An efficient join processing technique is provided that improves multi-level hash join performance by decomposing join operations into a set of opcodes that describe any complex hash join, pipelining execution of these opcodes across join levels, and sharing join operand metadata across opcodes. Complex multi-level joins are easier to describe and execute when decomposed into opcodes. The join technique decomposes multi-level join operations into a minimal set of opcodes such that the join work at each node of the multi-level join can be fully described as an execution of a sequence of opcodes. Operand metadata is shared across the opcodes of all join levels that reference the operand, thereby obviating the need to copy or transmit rows between the join nodes.

20 Claims, 9 Drawing Sheets

EFFICIENT OPCODE-DRIVEN PIPELINED EXECUTION OF MULTI-LEVEL HASH JOINS

FIELD OF THE INVENTION

The present invention relates to an efficient join processing technique to improve multi-level hash join performance.

BACKGROUND

Join queries combine rows from two or more tables based on a set of related "key" columns. A hash join of two tables is typically carried out by building the columns of one of the tables into a data structure during the "build" phase and using the key column of the other table to probe the data structure for matches during the "probe" phase. A hash join uses a hash table as the join data structure and is one of the most common and well-known join algorithms for joining large tables.

Multi-level hash joins involve joining more than two tables where the build and/or probe side rows of the join can come from the result of another join. Optimizing performance for multi-level joins is particularly tricky, because there is usually a combinatorial number of ways to join the participating tables with widely different space and speed tradeoffs.

Relational databases typically use dedicated optimizer software to determine the most efficient join algorithm as well as the order in which tables must be joined to reduce cost. Most industry solutions for processing multi-level joins involve joining two data sources (e.g., tables or results of another join) at a time and passing the resulting rows to the immediate parent level. The resulting data transfer cost is significant and can be prohibitive when joining many tables. Furthermore, this model where each join level is processed fully before moving to the parent join is not the most suitable for pipelining and/or parallelizing join work across levels. While pipelined hash joins are not uncommon in the database research community, they are primarily discussed in the context of multithreaded architectures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1B:
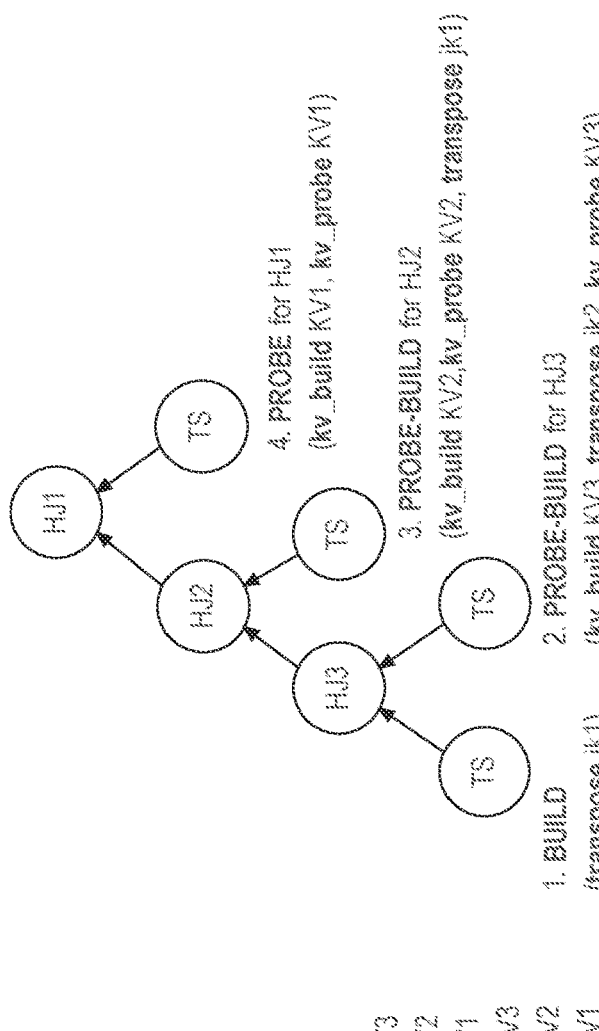
FIG. 1B illustrates an example of a left-deep join tree upon which aspects of the illustrative embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide an efficient join processing technique that improves multi-level hash join performance by decomposing join operations into a set of opcodes that describe any complex hash join, pipelining execution of these opcodes across join levels, and sharing join operand metadata across opcodes. Complex multi-level joins are easier to describe and execute when decomposed into opcodes.

The join technique decomposes multi-level join operations into a minimal set of opcodes such that the join work at each node of the multi-level join can be fully described as an execution of a sequence of opcodes. The opcodes are distinct from and operate at a lower level than SQL operators. In general, a SQL operator can be mapped to a sequence of opcodes. The join work at each node is driven by a scan of the data—the opcodes that describe the build and probe work at each join node are executed as data is read from different sources, which can be one or more tables associated with the multi-level join. Operand metadata is shared across the opcodes of all join levels that reference the operand, thereby obviating the need to copy or transmit rows between the join nodes.

The opcode-driven approach of the illustrative embodiments fundamentally changes how multi-level joins are described and processed in a relational database. Instead of processing one join at a time and treating each join node as an input to the next level, processing can skip over levels and pipeline the opcode execution over multiple levels to reduce processing time. The work done at each level of a multi-level join is described as a sequence of opcodes with shared metadata that helps skip row transfer between levels. The set of opcodes is a minimal set that can fully describe any complex hash join.

In addition, each opcode is defined such that it can be independently parallelized using any available parallelization mechanism. For example, single-instruction-multiple-data (SIMD) techniques are easy to apply for each opcode. Thus, the opcode-driven approach makes it possible to achieve a greater degree of parallelism for certain join types by parallelizing within each opcode as well as across pipelined opcodes. The opcode-driven approach makes it simpler on any hardware, and the opcodes are easy to pipeline across join levels and are simpler to parallelize.

While aspects of the illustrative embodiments are described with reference to a few join types (e.g., left deep, right deep, bushy), the opcodes are generic and easily extendible to other complex hash join types that are not described here.

Multi-Level Hash Join Trees

A multi-level hash join involves joining more than two tables and is typically processed as a sequence of single-level joins with the output of each join feeding into the input of the parent join level, as will be described below with reference to FIGS. 1A-1E. For any given join level of the join tree, the left child represents the build side of the join, and the right side represents the probe side of the join, respectively. A multi-level join can be viewed as a join of two sources of rows (row sources) where a row source is either a table scan or another hash join. A multi-level join execution typically starts with the bottom most (leaf) level join, with the output rows of the join feeding into the build or probe side of the parent join level.

Multi-level hash join trees can be arbitrarily complex. For the sake of simplicity, examples are shown as three common join trees—right-deep, left-deep, and bushy joins—to demonstrate the benefits of an opcode-driven approach to join processing. Typically, a join tree is represented as an upside-down tree structure. The input of a join can be the result set from a previous join.

A query optimizer in the database management system (DBMS) generates a query execution plan that optimizes the performance of the query. For a multi-level join, the query optimizer selects a multi-level join type that fits the tables involved in a query. For example, in a star schema, the fact table is typically the largest table, and the other tables are dimension tables, which are smaller. For example, the fact table may be a table of all sales orders, and there may be dimension tables for customer, supplier, product, and country. The table for sales orders will contain significantly more rows than the dimension tables. Queries involving tables in the star schema may be better suited for a right-deep join tree because it is more efficient to have smaller tables on the build side and the larger table on the probe side. On the other hand, there may be a query for which the lowest level join produces a low number of rows. In this case, a left-deep join tree may be more efficient. There may be other queries involving tables that fit a bushy join tree, such as a left-deep tree with a bushy parent or a right-deep tree with a bushy parent, as will be described in further detail below.

Figure 1A:
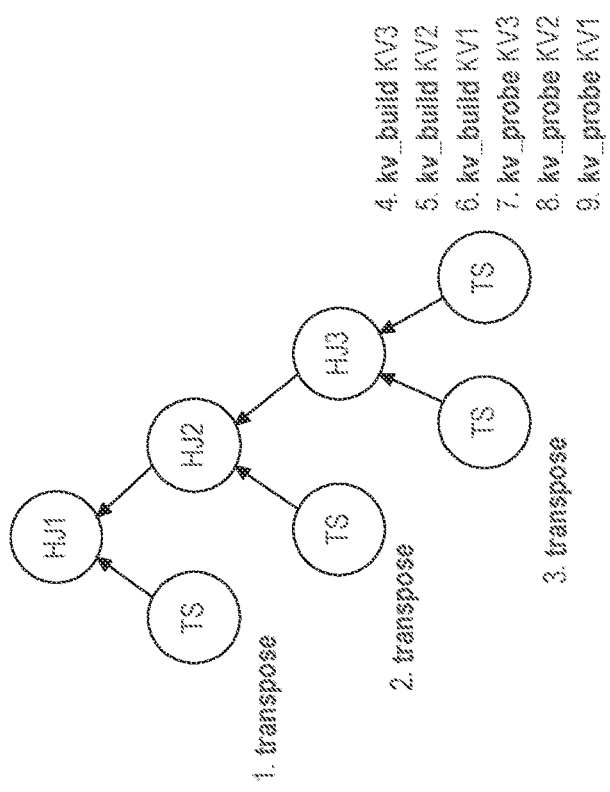
FIG. 1A illustrates an example right-deep join tree upon which aspects of the illustrative embodiment may be implemented.

FIG. 1A illustrates an example right-deep join tree upon which aspects of the illustrative embodiment may be implemented. A right-deep join is a multi-level join where the result of each join feeds the probe side of its parent join. If the left child of every internal node of a join tree is a table, then the tree is a right-deep join tree, as shown in FIG. 1A.

FIG. 1B illustrates an example of a left-deep join tree upon which aspects of the illustrative embodiments may be implemented. A left-deep join is a multi-level join where the result of each join feeds the build side of its parent join. If the right child of every internal node of a join tree is a table, then the tree is a left-deep join tree, as shown in FIG. 1B.

Figure 1D:
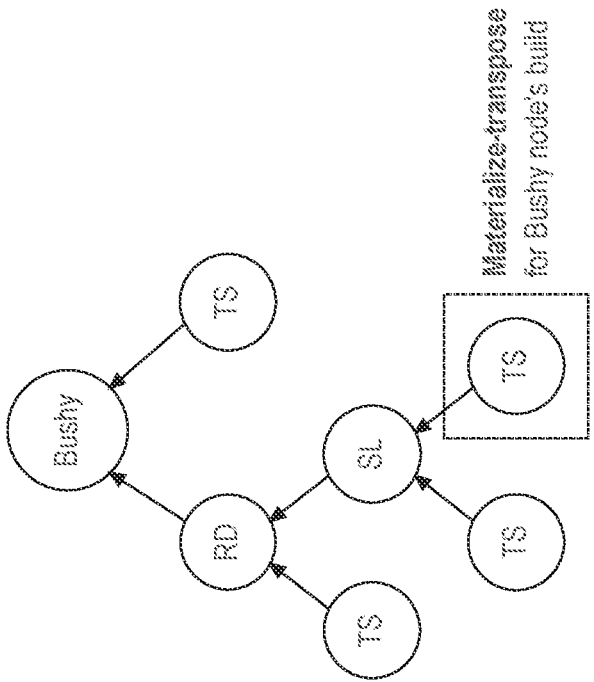
FIG. 1D illustrates an example bushy join tree having a left child that is a right-deep join tree and a right child that is a table scan.
Figure 1C:
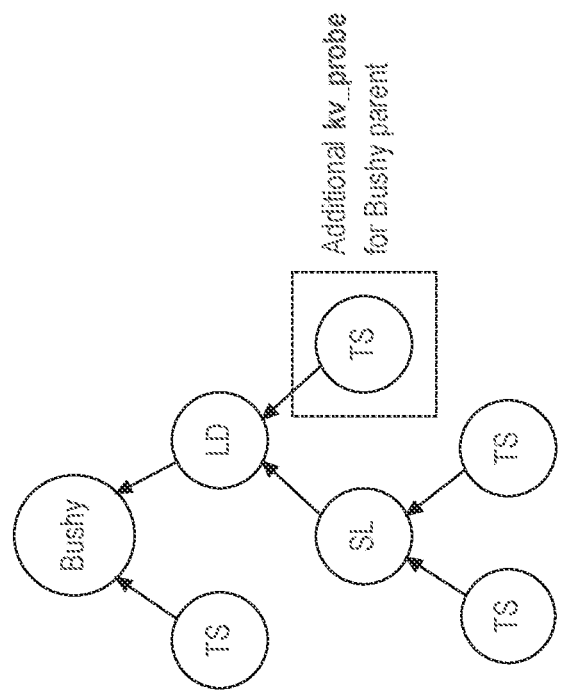
FIG. 1C illustrates an example bushy join tree having a left child that is a table scan and a right child that is a left-deep join tree.
Figure 1E:
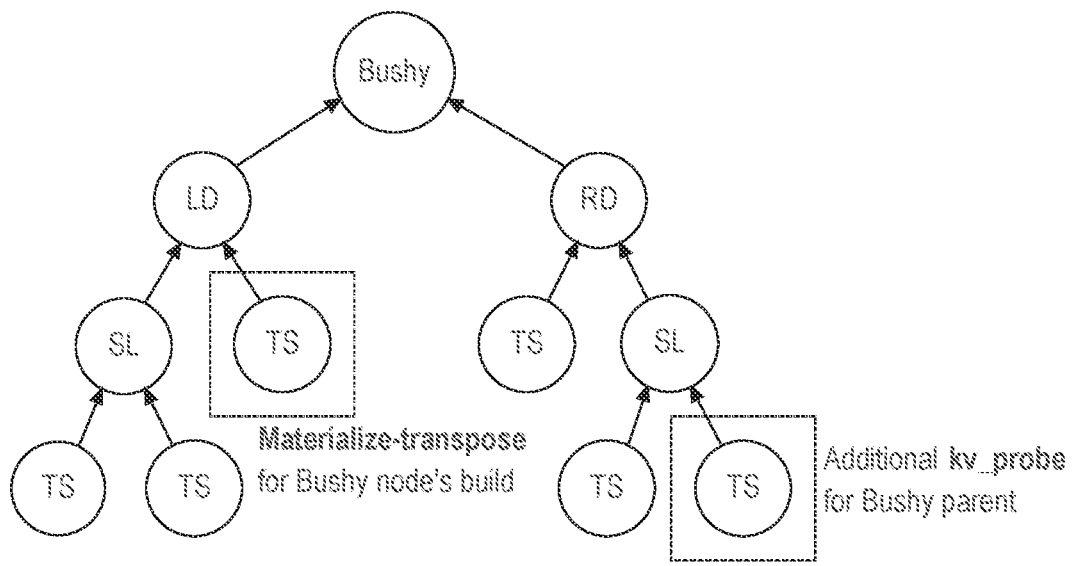
FIG. 1E illustrates an example bushy join tree having a left child that is a left-deep join tree and a right child that is a right-deep join tree.

FIGS. 1C-1E illustrate examples of bushy join trees upon which aspects of the illustrative embodiments may be implemented. In a multi-level hash join tree, nodes that are not single-level hash joins and are neither right-deep nor left-deep are classified as bushy nodes. In its most general form, a multi-level join can be a bushy-on-bushy plan where a bushy node is the parent of another bushy node. For the sake of simplicity, the example shown in FIGS. 1C and 1D are bushy plans where there is a single bushy node at the root of the supported sub tree. These examples are categorized by the bushy root nodes' left and right children. FIG. 1C illustrates an example bushy join tree having a left child that is a table scan and a right child that is a left-deep join tree. FIG. 1D illustrates an example bushy join tree having a left child that is a right-deep join tree and a right child that is a table scan. FIG. 1E illustrates an example bushy join tree having a left child that is a left-deep join tree and a right child that is a right-deep join tree.

Opcodes for Hash Join Processing

The illustrative embodiments provide a set of opcodes for hash join processing that can be combined and pipelined in different ways to achieve an efficient execution of multi-level hash joins. The opcode-driven approach simplifies the expression of the join work at each level, as will be demonstrated with reference to a few special multi-level join types. Pipelining the opcodes across the various join levels makes it easier to parallelize, thereby reducing the join processing time. While the techniques described here are specific to inner joins, they can be easily extended to other hash join types including semi and outer joins. Furthermore, the general approach of the illustrative embodiments is extendible beyond hash joins to more general join types with the introduction of additional opcodes.

For a multi-level hash join, the following primary opcodes encapsulate the operations required at each join level (opcodes are shown in bold):

1) Build a key-value (KV) table for the rows obtained from the left child row source.
2) Probe the KV table with the rows from the right child row source.
3) Materialize the full join result at a given join level.
4) Distribute the join result across multiple processes for parallelization.

Build

Rows from the left child row source are buffered and the columns of interest including the join key column for the current level, the join key columns for any as join levels, and the columns that are finally projected from the root join level are cached. This operation is referred to as transpose because an efficient way to cache this data is in row format, and a transpose of rows from columnar to row format is often required when working with in-memory columnar databases. The transpose opcode operates on a table scan and can perform operations such as filtering out rows or columns of a table. For column format data, the transpose opcode can stitch together the columns of interest in one or more levels of the multi-level join. For row format data, the transpose opcode can filter or mask out columns that are not of interest.

After all the build-side rows are transposed, they must be added to a key-value (KV) table that is often segmented. This requires a hash computation of the join key values followed by a partition operation on the rows by hash before being added to the KV table (kv_build). In the examples described to illustrate the illustrative embodiments, the KV table may be a hash table; however, the kv_build can also build other data structures that can be probed for a join.

Opcodes, particularly secondary opcodes, need not necessarily feed into the immediate parent node of a multi-level join. An opcode can feed into a higher-level node in the join tree. For example, the transpose opcode may transpose rows and columns used by the immediate join, the parent join, a higher level join, such as columns to be projected out by the root node.

Probe

Columns of interest (i.e., join key for the current join and parent join levels and the final projection columns) are obtained from the right child row source. If the right child row source is another join, then the columns of interest must be gathered from the location where they were transposed. The transpose step may not always be required during the probe—there is only a transpose for a given level of a multi-level join if some columns from the current join level are required at one or more parent levels. For instance, the transpose step can be skipped for the root join level, because the join result after probing the KV table can be immediately returned to the end user. Along the same lines as the build side, a hash is performed on the join key, and the KV table is probed (kv_probe) for matching rows.

Materialize

Early and later materialization are supported—the join result can be materialized 1) after each join node, 2) after a subset of n join nodes are processed, or 3) at the end of the query after processing all join nodes is complete.

Typically, when finishing the join work at one level and switching to the parent join level, the join result of the current level is not immediately gathered from the transposed locations. Instead, the gathering is deferred to whenever these columns are next required. This is an optimization to avoid an expensive gather at each level because most of these columns will likely be transposed again at the parent level. However, in certain cases, it may be more efficient to materialize the entire result and re-transpose at the parent level. One example of when this may be desired is if a join level has pruned most of the rows to produce a very small join result. In this case, it is beneficial to free the memory reserved for the possibly large transpose buffers at the child join levels and to create new, smaller transpose buffers at the parent level. A full materialization of the join result may involve multiple gather operations from several transpose buffers.

Distribute

The Distribute opcode is specific to multi-level hash joins executing using parallel query. With parallel query, the result of each join is hash-distributed to the processes that are executing the parent join. If the transpose buffers and the KV-table are in shared memory, then the distribute operation is simple—the operation gathers the parent join key, computes the hash, and projects the key to the process executing the parent join. If working with process private memory, then the distribute operation requires a full materialize operation on the join result followed by a project operation to the process executing the parent join.

The primary opcodes described above can be further decomposed into a finer granularity of secondary opcodes to allow for optimizations, such as skipping certain columns that are only temporarily required by one or more join levels. One possible high-level decomposition of the primary opcodes into secondary opcodes is as follows:

The Build opcode is composed of transpose, hash, partition, and kv_build.

The Probe opcode is composed of gather, transpose, hash, and kv_probe.

The Materialize opcode is composed of gather and transpose.

The Distribute opcode is composed of gather, hash, project, and transpose.

Figure 2:
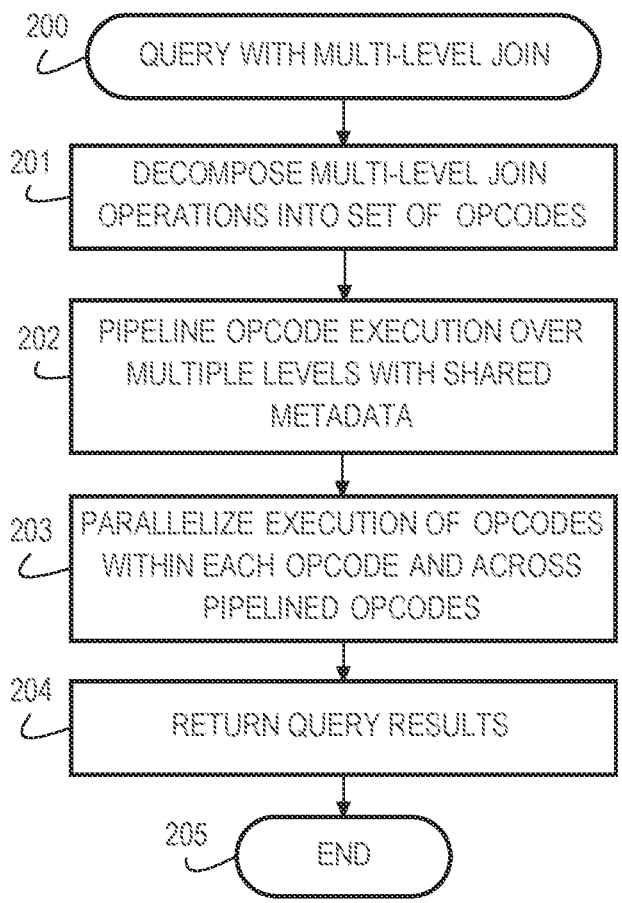
FIG. 2 is a flowchart illustrating operation of an opcode-driven approach for multi-level joins in accordance with an illustrative embodiment.

FIG. 2 is a flowchart illustrating operation of an opcode-driven approach for multi-level joins in accordance with an illustrative embodiment. Operation begins when a query with a multi-level join is received (block 200). The DBMS decomposes the multi-level join operations into a set of opcodes (block 201). The DBMS then pipelines opcode execution over multiple levels with shared metadata (block 202) and parallelizes execution of the opcodes within each opcode and across pipelined opcodes (block 203). After completion of the multi-level join, the DBMS returns query results to the client (block 204). Thereafter, operation ends (block 205).

Following is a description of some examples of opcode decomposition for some well-known multi-level join types.

Right-Deep Joins

A right-deep join is a multi-level join where the result of each join node feeds the probe side of its parent join. Returning to FIG. 1A, in accordance with an illustrative embodiment, an n-node right-deep join is composed of the following:

A. A sequence of n independent Build opcodes (shown as the secondary transpose and kv_build opcodes in FIG. 1A), one per level, followed by, B. A [probe]+(multi-probe) phase that involves probing the KV table (kv_probe) of each join level in order, starting with the leaf-level join.

The n Build opcodes (transpose, kv_build in FIG. 1A) are independent of each other and can be parallelized to improve performance. For example, all of the transpose opcodes can be executed in parallel, and all of the kv_build opcodes can be executed in parallel, although a transpose of a given level (node) must be executed before the kv_build of the same given level. Also, the Build opcodes for a given level must be executed before the kv_probe opcode can be executed on the KV table that is generated by the Build opcodes. In addition, the execution of secondary opcodes of each build (hash-transpose-kv_build) can be optimized for both memory and speed with pipeline parallelism.

The probe work of a right-deep join is a prime candidate for pipelining. Once the KV-tables at each parent level are made available, the n Probe opcodes of the right-deep [probe]+operation can be pipelined and parallelized because a join level's probe does not need to be completed before starting a probe at the parent level.

Left-Deep Joins

A left-deep join is a multi-level join where the result of each join node feeds the build side of its parent join. Returning to FIG. 1B, in accordance with an illustrative embodiment, an n-node left-deep join is composed of:

A. A Build opcode at the bottom-most join nodes' build table followed by:

B. A sequence of Probe-Build opcodes at each join node i ranging from n to 2 (i.e., at each parent node up to and not including the root node) involving the following:
   1. Build KV (kv_build) table for join node i.
   2. For any given set of probe rows:

3. transpose of required columns of the probe table at node i, including projection columns as well as any join keys for parent level joins.
   a. Probe KV table (kv_probe) at node i to get probe results for node i.
   b. Gather and transpose of the join key of the immediate parent.
      i. If a probe column at level i serves as the join key of the immediate parent, there is a gather of the column from the scan rows using the probe result step (b) and transpose to the parent level;
      ii. Otherwise, use probe results from nodes <=i to gather and transpose the join key for the patent node i−1.
C. A probe opcode at node 1 (root node) involving the following:
   1. Build KV table (kv_build) for join node 1.
   2. For any given set of probe rows,
      a. Probe KV table (kv_probe) at node 1 to get final probe.
      b. Gather and project build columns using transpose buffers from child nodes.
      c. Gather and project probe columns from the probe table at level 1 using the probe row identifiers of node 1.

Unlike the right-deep join, the build opcodes cannot be parallelized, because the probe of one level must complete before the build of the parent level. This will be taken into consideration by the optimizer when determining whether to plan a multi-level join as a right-deep join or a left-deep join. The optimizer can use table statistics and prior execution statistics to determine the best join plan for a multi-level join. A decision to make a node in a join tree right-deep, left-deep, or bushy can be decided on a level-by-level basis.

Bushy Joins

In a multi-level hash join tree, nodes that are not single-level hash joins and are neither left-deep nor right-deep are classified as bushy nodes. In its most general form, multi-level joins can be bushy-on-bushy plans, i.e., plans where a bushy node is the parent of another bushy node. For the sake of simplicity, the examples described herein include a few simpler bushy plans where there is a single bushy node at the root of the supported sub-tree. These examples are categorized by the root bushy node's left and right children below. The additional opcodes required to process these bushy joins are specified, in addition to the opcodes already discussed for the left-deep and right-deep children discussed in the previous sections.

The two new operations that are required for bushy plans are as follows:
A. Non-table scan left child: materialize-transpose opcodes for the build side of the bushy parent.
B. Non-table scan right child: additional probe for the probe side of the bushy parent.

Returning to FIG. 1C, a multi-level join is shown with a bushy node having a table scan as the left (build-side) child and a left-deep join as the right (probe-side) child. The left-deep join node has a single-level join as a left (build-side) child and a table scan as a right (probe-side) child. In this example, the left-deep join includes an additional probe opcode on the probe side for the bushy parent.

Returning to FIG. 1D, a multi-level join is shown with a bushy node having a right-deep join as the left (build-side) child and a table scan as the right (probe-side) child. The right-deep join has a table scan as a left (build-side) child and a single-level join as a right (probe-side) child. In this example, the right-deep join includes additional materialize-transpose opcodes on the build side of the bushy node.

Returning to FIG. 1E, a multi-level join is shown with a bushy node having a left-deep join as the left (build-side) child and a right-deep join as the right (probe-side) child. In this example, the left-deep join includes additional materialize-transpose opcodes for the build side of the bushy node, and the right-deep join includes an additional probe opcode for the probe side of the bushy node. The same is true for a multi-level join having a bushy node with a bushy node as the left (build-side) child and a bushy node as the right (probe-side) child. That is, each child of the bushy parent will include additional materialize-transpose opcodes for the build side of the bushy parent and an additional probe opcode for the probe side of the bushy parent.

Example Multi-Level Joins

Consider the following multi-level join with three hash join nodes (HJ1, HJ2, and HJ3), the join query (Query 1) being as follows:
SELECT T4.m3, T3.m3, T1.m1
FROM T4, T3, T1
WHERE T4.jk3=T3.jk3 AND
T2.jk2=T4.jk2 AND
T3.jk1=T1.jk1;

In this case, the query involves four tables (T1, T2, T3, and T4). Table T1 has at least two columns (jk1, m1), table T2 has at least one column (jk2), table T3 has at least three columns (jk1, jk3, m3), and table T4 has at least three columns (jk2, jk3, and m3). The tables may have other columns that are not involved in the query. For the query, there will be a table scan of each table, and certain opcodes will operate on the table scan of the tables.

Figure 3A:
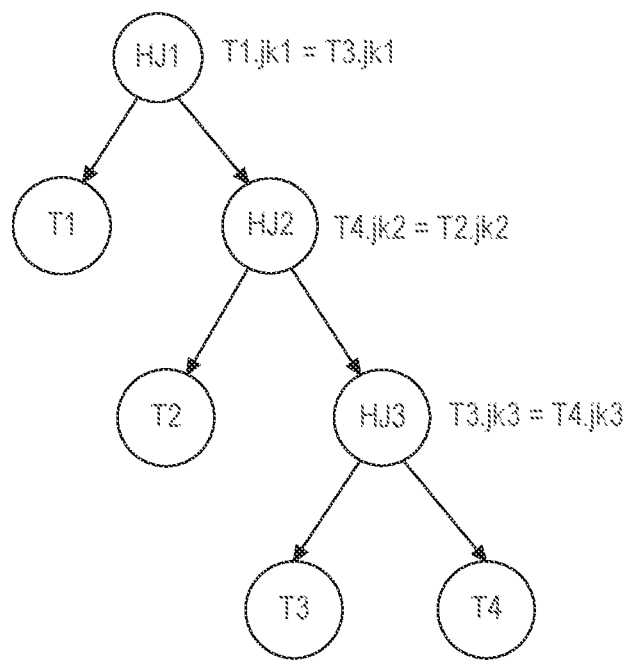
FIG. 3A illustrates a right-deep multi-level join tree for a query in accordance with an illustrative embodiment.

FIG. 3A illustrates a right-deep multi-level join tree for Query 1 in accordance with an illustrative embodiment. In this example, tables T1, T2, and T3 are build-side tables, and table T4 is a probe-side table. This join tree may be optimal for Query 1 because T1, T2, and T3 are all small tables (e.g., dimension tables), while T4 is a large table (e.g., fact table); therefore, it is best for T1, T2, and T3 to be build-side tables. For table T1, the opcodes include:
   a transpose operating on a table scan of table T1 to transpose rows and columns used by HJ1 and projected out in the query, including transpose T1.jk1 for hash join HJ1;
   a hash of the join key (jk1) for HJ1 and column m1 to be projected out, including hash T1.jk1, T1.m1.
For table T2, the opcodes include:
   a transpose operating on a table scan of table T2 to transpose rows and columns used by HJ2 (no columns of T2 projected out in the query), including transpose T2.jk2;
   a hash of the join key (jk2) for hash join HJ2, including hash T2.jk2.
For table T3, the opcodes include:
   a transpose operating on a table scan of T3 to transpose rows and columns used by HJ3 and projected out in the query, including transpose T3.m3, T3.jk3, T3.jk1;
   a hash of the join keys (jk3) in table T3, including hash T3.jk3.
For table T4, the opcodes include:
   a kv_build for HJ3 to produce key-value table KV3, a kv_build for HJ2 to produce key-value table KV2, and a kv_build for HJ1 to produce key-value table KV1;
   a hash of the join key (jk3) in table T4 and a kv_probe of KV3;
   a gather of T4.jk2 for HJ2 using the probe results of KV3;

a hash of the join key (jk2) in table T4 and a kv_probe of KV2;

a gather of T3.jk1 using the probe results of KV3 and KV2;

a hash of the join key T3.jk1 and a kv_probe of KV1;

a gather of T3.m3, T4.m3, T1.m1 using the probe results of KV3, KV2, KV1;

a project operation for T3.m3, T4.m3, T1.m1 to project the results of the query.

Note that the build opcodes must be performed before the probe opcodes, because the build opcodes produce a data structure (e.g., key-value table) to be probed. Therefore, the transpose, hash, and kv_build opcodes that produce KV3 must be performed before the kv_probe of KV3. Otherwise, the various opcodes can be pipelined to optimize performance of the query, including performing some opcodes in parallel. For example, all of the transpose opcodes of T1, T2, and T3 for producing KV1, KV2, and KV3 can be performed concurrently.

Figure 3B:
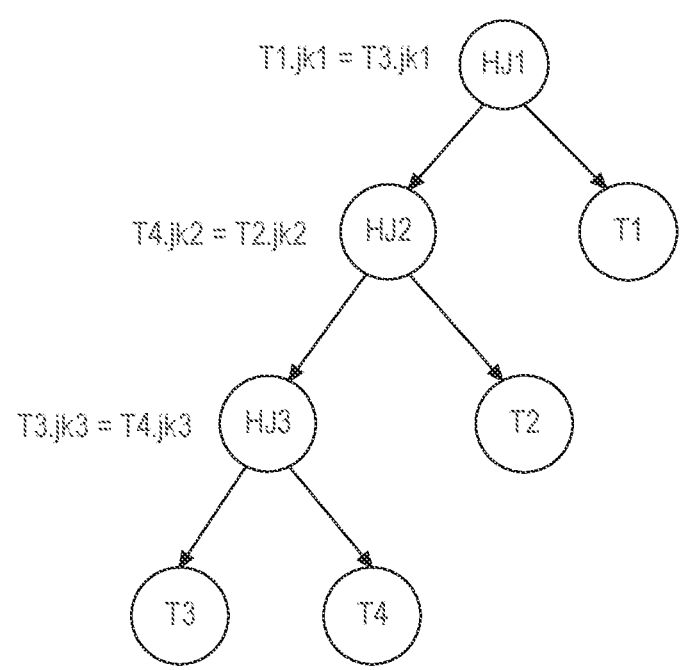
FIG. 3B illustrates a left-deep multi-level join for a query in accordance with an illustrative embodiment.

FIG. 3B illustrates a left-deep multi-level join for Query 1 in accordance with an illustrative embodiment. In this example, table T3 is a build-side table, and tables T1, T2, and T4 are probe-side tables. This join tree might be optimal because T3 is significantly smaller than T1, T2, and T4; therefore, there is only one build-side table that is relatively small, resulting in fewer rows being produced by HJ3 and used in HJ1 and HJ2. Starting with the single level join HJ3, for table T3, the opcodes include:

a transpose operating on a table scan of T3 to transpose rows and columns used by HJ3 and projected out in the query, including transpose T3.jk3, T3.jk1, T3.m3;

a hash of the join key (jk3) for HJ3, including hash T3.jk3.

For T4, the opcodes include:

a kv_build for HJ3 to produce key-value table KV3;

a hash of T4.jk3 for HJ3 and a kv_probe of KV3;

a gather of T4.jk2 for HJ2 using the probe results of KV3;

a hash of T4.jk2 and a transpose of T4.jk2 for HJ2.

For T2, the opcodes include:

a kv_build for HJ2 to produce key-value table KV2;

a hash of T2.jk2 for HJ2 and a kv_probe of KV2;

a gather of T3.jk1 using the probe results of KV2;

a transpose of T3.jk1.

For T1, the opcodes include:

a kv_build for HJ1 to produce key-value table KV1;

a hash if T3.jk1 and a kv_probe of KV1 for HJ1;

a gather of T3.m3, T4.m3, T1.m1 using the probe results of KV1, KV2, and KV3 and a project operation for T3.m3, T4.m3, T1.m1 to project the results of the query.

Note that for the transpose of T3, the transpose opcode transposes jk3 for hash join HJ3, jk1 for the hash join HJ1, and m3 for the materialize primary opcode to project T3.m3. This could be separated into two or three separate transpose opcodes, such as a transpose of T3.m3 later for late-stage materialization. The opcode approach of the illustrative embodiments allows for greater flexibility in the order and timing of execution of the individual opcodes.

Note that the gather of T4.jk2 is performed after the kv_probe of KV3. This is because the rows being gathered for T4.jk2 to be used in HJ2 are filtered by the results of HJ3. Furthermore, the gather of T3.jk1 is performed after the kv_probe of KV2 and the kv_probe of KV1, because the rows being gathered for T3.jk1 to be used in HJ1 are filtered by the results of HJ3 and HJ2. Further, the final gather of T3.m3, T4.m3, T1.m1 for the materialize primary opcode are performed at the end, because the rows being gathered for these columns are filtered by the results of HJ3, HJ2, and HJ1.

Figure 3C:
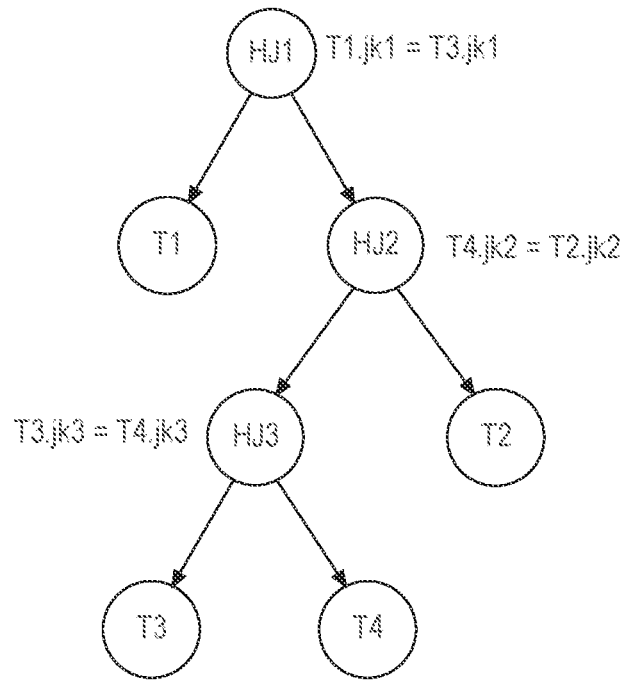
FIG. 3C illustrates a bushy join for a query with a left-deep join as the right (probe-side) child in accordance with an illustrative embodiment.

FIG. 3C illustrates a bushy join for Query 1 with a left-deep join as the right (probe-side) child in accordance with an illustrative embodiment. In this example, HJ3 is a single-level join, HJ2 is a left-deep join with a bushy parent (HJ1). T1 and T3 are build-side tables, and tables T2 and T4 are probe-side tables. HJ1 is a bushy join because the left child is a table scan, and the right child is a left-deep multi-level join. This join tree might be optimal if it is determined that HJ3 produces a small number of rows and T1 significantly smaller than T2. Starting with the build-side tables, for table T1, the opcodes include:

a transpose of T1.jk1 and T1.m1;

a hash of T1.jk1.

For table T3, the opcodes include:

a transpose of T3.jk3, T3.jk1, T3.m3;

a hash of T3.jk3.

For table T4, the opcodes include:

a kv_build for HJ3 to produce key-value table KV3;

a hash of T4.jk4 and kv_probe of KV3 for HJ3;

a gather of T4.jk2 using the probe results of KV3;

a hash of T4.jk2 and transpose of T4.jk2 for HJ2.

For table T2, the opcodes include:

a kv_build for HJ2 to produce key-value table KV2 and a kv_build for HJ2 to produce KV1;

a hash of T2.jk2 and kv_probe of KV2 for HJ2;

a gather of T3.jk1 using the probe results of KV2 and KV1;

a kv_probe of KV1 for HJ1;

a gather of T3.m3, T4.m3, T1.m1 using the probe results of KV1, KV2, and KV3 and a project operation for T3.m3, T4.m3, T1.m1 to project the results of the query.

Note that for table T4, there is an additional kv_probe of KV2 for the bushy parent, HJ1. This provides rows from T3.jk1 based on the results of hash join HJ2, which are used in the kv_probe of KV1 for HJ1.

Figure 3D:
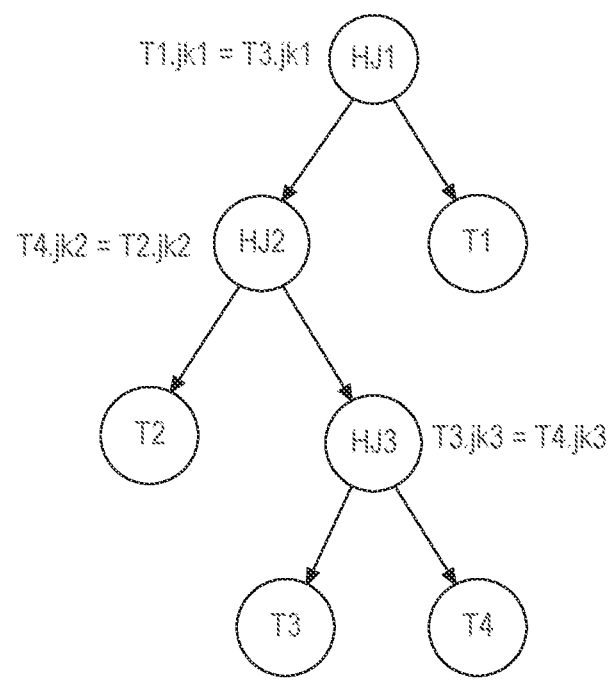
FIG. 3D illustrates a bushy join for a query with a right-deep join as the left (build-side) child in accordance with an illustrative embodiment.

FIG. 3D illustrates a bushy join for Query 1 with a right-deep join as the left (build-side) child in accordance with an illustrative embodiment. In this example, HJ3 is a single-level join, HJ2 is a right-deep join with a bushy parent (HJ1). T2 and T3 are build-side tables, and tables T1 and T4 are probe-side tables. HJ1 is a bushy join because the left child is a right-deep multi-level join and the right child is a table scan. Starting with the build-side tables, for table T2, the opcodes include:

a transpose of T2.jk2;

a hash of T2.jk2.

For table T3, the opcodes include:

a transpose of T3.m3, T3.jk3, T3.jk1;

a hash of T3.jk3.

For table T4, the opcodes include:

a kv_build for HJ3 to produce key-value table KV3 and a kv_build for HJ2 to produce key-value table KV2;

a hash of T4.jk4 and kv_probe of KV3 for HJ3;

a gather of T4.jk2 using the probe result of KV3;

a hash of T4.jk2 and kv_probe of KV2;

materialize: a gather and transpose of T3.m3, T4.m3, T3.jk1 using the probe results of KV2 and KV3.

For table T1, the opcodes include:

a kv_build for HJ1 to produce key-value table KV1;

a hash of T1.jk1 and kv_probe of KV1 for HJ1;

a gather of T3.m3, T4.m4, T1.m1 using the probe results of KV1;

a project operation for T3.m3, T4.m3, T1.m1 to project the results of the query.

Note that there are additional gather and transpose opcodes of T3.m3, T4.m3, T3.jk1 using the results of HJ2 and HJ3. This is not required but is an optimization to materialize the results early rather than having to materialize the rows later over multiple hops. This is particularly important for larger join trees that change their shape as they go up toward the root join where the results are projected out.

Figure 3E:
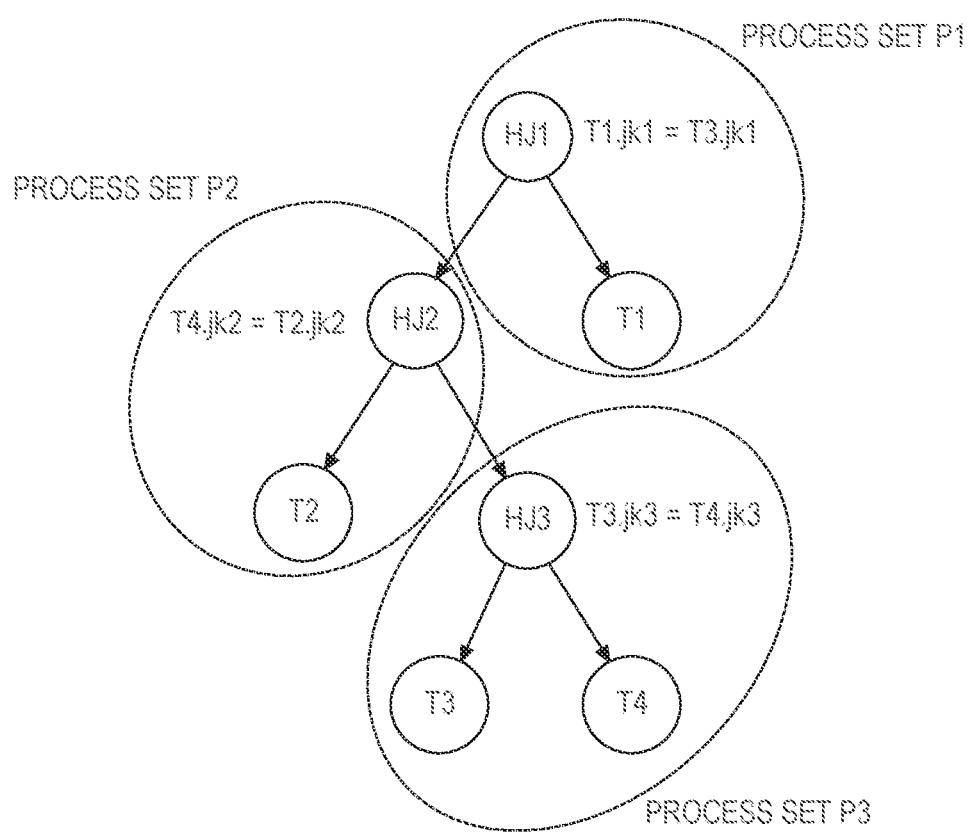
FIG. 3E illustrates a parallel multi-level join for a query with process private memory in accordance with an illustrative embodiment.

FIG. 3E illustrates a parallel multi-level join for Query 1 with process private memory in accordance with an illustrative embodiment. In this example, HJ3 is a single-level join, HJ2 is a right-deep join with a bushy parent (HJ1). T2 and T3 are build-side tables, and tables T1 and T4 are probe-side tables. Hash join HJ1 is performed by process set P1, hash join HJ2 is performed by process set P2, and HJ3 is performed by process set P3. Each process set includes one or more processes. For example, process set P2 may have a first subset of processes performing the table scan of T2 and a second set of processes working on the table scan results in shared memory to build the transpose tables to be used in the query.

Starting with the HJ3 level, process set P3 performs the following:
- a transpose of T3.jk3;
- a hash of T3.jk3 and a kv_build of KV3 for HJ3;
- a hash T4.jk4 and kv_probe of KV3 for HJ3;
- distribute:
  - a gather of T3.jk1, T3.m3, T4.m3, T4.jk2;
  - a hash of T4.jk2;
  - a project of T3.jk1, T3.m3, T4.m3 to project result to process set P2 by hash.

For the HJ2 level, process set P2 performs the following:
- a hash of T2.jk2 and a kv_build of KV2 for HJ2;
- distribute:
  - a transpose of T3.jk1, T3.m3, T4.m3 received from P3;
- a hash of T4.jk2 and a kv_probe of KV2 for HJ2;
- distribute:
  - a gather of T3.jk1, T3.m3, T4.m3;
  - a hash of T3.jk1;
  - a project of T3.jk1, T3.m3, T4.m3 to process set P1 by hash.

For the HJ1 level, process set P1 performs the following:
- distribute:
  - a transpose of T3.jk1, T3.m3, T4.m3 received from P2;
- a hash of T3.jk1 and a kv_build of KV1 for HJ1;
- a hash of T1.jk1 and kv_probe of KV1 for HJ1;
- a gather of T3.m3, T4.m3, T1.m1;
- a project of T3.m3, T4.m3, T1.m1 to project the result of the query.

The distribute primary opcode has two components: one for the sender and one for the receiver. Therefore, note that P3 has a project opcode to distribute results to process set P2, which has a transpose opcode to transpose the results received from P3. Similarly, P2 has a project opcode to distribute results to process set P1, which has a transpose opcode to transpose results received from P2. The project opcode is on the sender side, and the transpose opcode is on the receiver side.

In this example, the process sets use process-private memory and, thus, do not share memory. The project opcode distributes based on the join key of the hash join of the process set to which the results are being delivered. Thus, for the distribute from P3 to P2, the process set P3 performs a gather of the columns that will be used for the remainder of the query, a hash of T4.jk2 (jk2 is the join key of HJ2), and a project to distribute the results to P2 based on the hash of the join key jk2. Similarly, for the distribute from P2 to P1, the process set P2 performs a gather of the columns that will be used for the remainder of the query, a hash of T3.jk1 (jk1 is the join key for HJ1), and a project to distribute the results to P1 based on the hash of the join key jk1. If the process sets shared memory, then each process set would simply need to forward the hash of the join key to the next process set.

The opcode approach of the illustrative embodiments provides flexibility in distributing work between process sets, as well as pipelining and parallelizing work within a process set. Some work between process sets can be performed in parallel, and some work within a process set can be performed in parallel.

Shared Operand Metadata Across Join Levels

Each level of a multi-level join is associated with a set of build-side operands and a set of probe-side operands. A single operand can be a join key at one or more join nodes or a projection column at one or more other nodes. While the values of operands at a given join may come from the join result of a child join node, the origin of the values can be traced back to one or more columns of a table scan. Consequently, an efficient way to share operand metadata is to define the operand at the base table scan that is associated with it and to have all other join nodes reference this operand definition at the base table. This ensures that any modification to an operand is always immediately visible to all join levels and obviates the need to copy or transfer rows between join levels.

Figure 4:
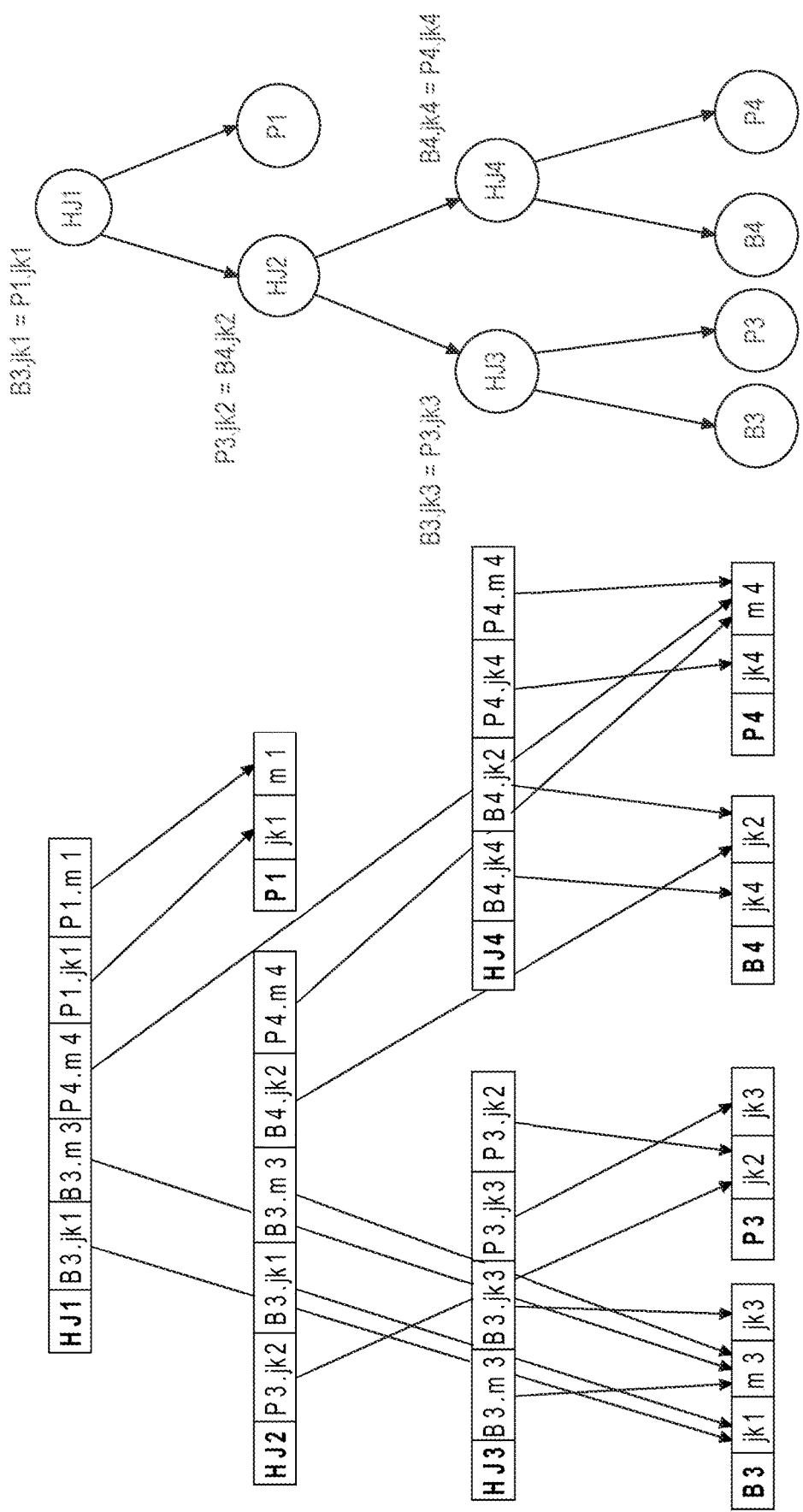
FIG. 4 illustrates shared operand metadata for an example multi-level bushy join in accordance with an illustrative embodiment.

FIG. 4 illustrates shared operand metadata for an example multi-level bushy join in accordance with an illustrative embodiment. Consider the following multi-level bushy join with four hash join nodes (HJ1, HJ2, HJ3, and HJ4), the join query being as follows:

SELECT B3.m3, P4.m4, P1.m1
FROM B3, P3, P4, P1
WHERE B3.jk3=P3.jk3 AND
B4.jk4=P4.jk4 AND
P3.jk2=B4.jk2 AND
B3.jk1=P1.jk1;

The multi-level join tree and the shared operands are shown in FIG. 4. HJ1, HJ2, HJ3, and HJ4 represent the hash joins from Query 2 above, which are represented in the join tree in FIG. 3, and P1, B3, P3, B4, and P4 represent the metadata generated during the table scans of the underlying tables. Operand metadata is defined at the base tables and referenced by the hash join levels. Hash join HJ1 refers to operands B3.jk1 and B3.m3 from table B3, P4.m4 from table P4, and P1.jk1 and P1.m1 from table P1. Hash join HJ2 refers to operands P3.jk2 from table P3, B3.jk1 and B3.m3 from table B3, B4.jk2 from table B4, and P4.m4 from table P4. Hash join HJ3 refers to operands B3.m3 and B3.jk3 from table B3, and P3.jk3 and P3.jk2 from table P3. Hash join HJ4 refers to operands B4.jk4 and B4.jk2 from table B4, and P4.jk4 and P4.m4 from table P4.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, a branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

A database object may have an attribute that is a primary key. A primary key contains primary key values. A primary key value uniquely identifies a record among the records in the database object. For example, a database table may include a column that is a primary key. Each row in the database table holds a primary key value that uniquely identifies the row among the rows in the database table.

A database object may have an attribute that is a foreign key of a primary key of another database object. A foreign key of a primary key contains primary key values of the primary key. Thus, a foreign key value in the foreign key uniquely identifies a record in the respective database object of the primary key.

A foreign key constraint based on a primary key may be defined for a foreign key. A DBMS ensures that any value in the foreign key exists in the primary key. A foreign key need not be defined for a foreign key. Instead, a foreign key relationship may be defined for the foreign key. Applications that populate the foreign key are configured to ensure that foreign key values in the foreign key exist in the respective primary. An application may maintain a foreign key in this way even when no foreign relationship is defined for the foreign key.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
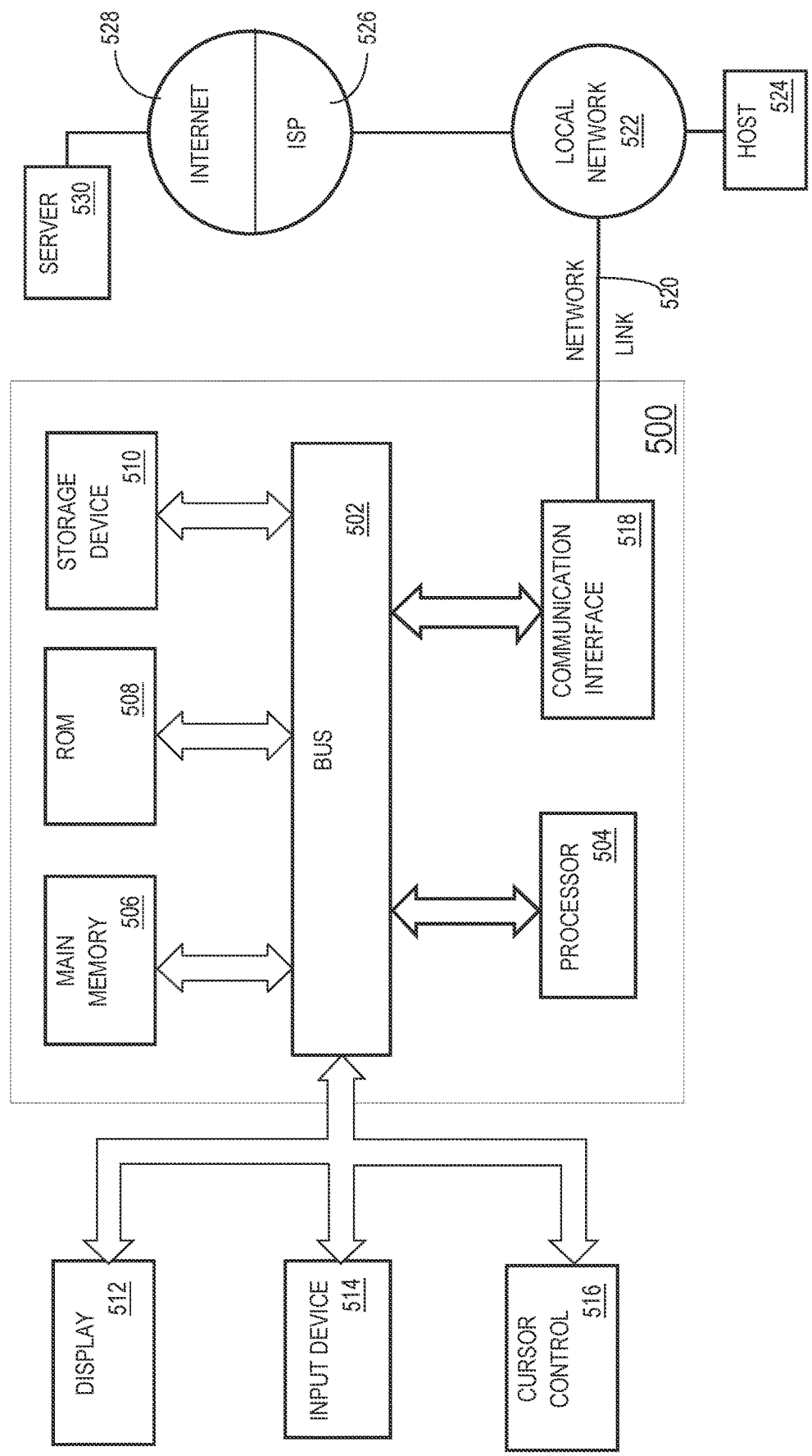
FIG. 5 is a block diagram that illustrates a computer system upon which aspects of the illustrative embodiments may be implemented.

For example, FIG. 5 is a block diagram that illustrates a computer system 500 upon which aspects of the illustrative embodiments may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
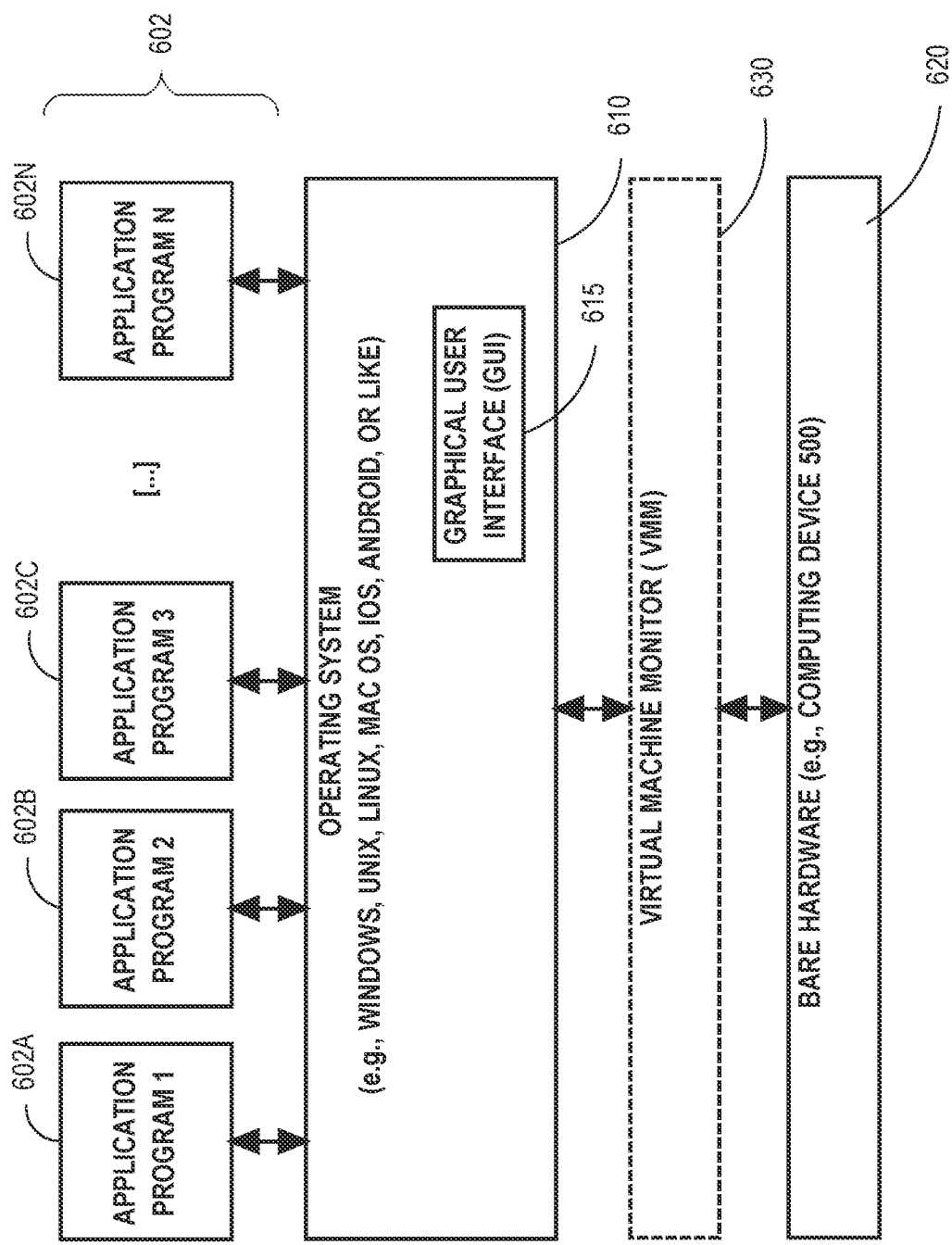
FIG. 6 is a block diagram of a basic software system that may be employed for controlling the operation of a computer system upon which aspects of the illustrative embodiments may be implemented.

FIG. 6 is a block diagram of a basic software system 600 that may be employed for controlling the operation of computer system 600 upon which aspects of the illustrative embodiments may be implemented. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   executing a join operation, wherein:
   executing the join operation comprises:
   decomposing the join operation into a set of opcodes; and
   pipelining execution of the set of opcodes,
   the set of opcodes is a minimal set of opcodes that fully describe the join operation,
   join operand metadata is shared across the set of opcodes,
   the set of opcodes includes one or more primary opcodes comprising at least one of:
   a primary build opcode for building columns of a build-side row source at a given join level of the join operation into a data structure, a primary probe opcode that uses a key column of a probe-side row source at the given join level to probe the data structure for matches, a primary materialize opcode that materializes a join result at the given join level, or a primary distribute opcode that distributes the join result at the given join level across multiple processes for parallelization, and wherein the method is performed by one or more computing devices.

2. The method of claim 1, wherein the primary probe opcodes are pipelined and executed in parallel.

3. The method of claim 1, wherein each of the one or more primary opcodes is decomposed into one or more secondary opcodes selected from the group consisting of:

a transpose opcode,
a hash opcode,
a partition opcode,
a key-value-build opcode,
a gather opcode,
a key-value-probe opcode, and
a project opcode.

4. The method of claim 3, wherein:

the primary build opcode is decomposed into one or more of the transpose opcode, the hash opcode, the partition opcode, or the key-value-build opcode, the primary probe opcode is decomposed into one or more of the gather opcode, the transpose opcode, the hash opcode, and the key-value-probe opcode, the primary materialize opcode is decomposed into one or more of the gather opcode and the transpose opcode, and the primary distribute opcode is decomposed into one or more of the gather opcode, the hash opcode, the project opcode, and the transpose opcode.

5. The method of claim 1, wherein the join operation is a multi-level join involving a plurality of join operations on more than two tables.

6. The method of claim 5, wherein pipelining execution of the set of opcodes comprises:

providing output of a first opcode in a given level of the multi-level join to a second opcode in a higher level of the multi-level join, wherein the higher level is not an immediate parent level of the given level.

7. The method of claim 5, wherein:

pipelining execution of the join operation comprises pipelining the multi-level join as a right-deep join wherein a result of each join feeds a probe side of its parent join, and the right-deep join comprises:

a build phase comprising a primary build opcode for building a key-value table for a build-side row source per level, and multi-probe phase comprising a primary probe opcode that uses a key column of a probe-side row source to probe the key-value table of each join level, in order, starting with a leaf level join of the multi-level join.

8. The method of claim 5, wherein:

pipelining execution of the join operation comprises pipelining the multi-level join as a left-deep join wherein a result of each join feeds a build side of its parent join, the left-deep join comprises:

a transpose opcode for a join key of a build-side row source of a leaf-level join in the multi-level join, a sequence of probe-build phases at each given non-root level of the multi-level join comprising a key-value-build opcode for the given non-root level, a transpose opcode for columns of a probe-side table of the given non-root level, a key-value-probe opcode to generate probe results for the given non-root level, and a probe phase at a root level of the multi-level join comprising a key-value build opcode for a root-level join and a key-value-probe opcode to generate a final probe result for the root-level join.

9. The method of claim 5, wherein:

pipelining execution of the join operation comprises pipelining a given level of the multi-level join as a bushy join, wherein a probe-side child join of the given level is a left-deep join or a right-deep join, and the multi-level join comprises an additional probe opcode on a probe-side of the probe-side child join for the bushy join.

10. The method of claim 5, wherein:

pipelining execution of the join operation comprises pipelining a given level of the multi-level join as a bushy join, wherein a build-side child join of the given level is a left-deep join or a right-deep join, and the multi-level join comprises an additional materialize opcode on a probe-side of the build-side child join for the bushy join.

11. The method of claim 5, wherein:

pipelining execution of the join operation comprises pipelining a given level of the multi-level join as a bushy join, wherein a build-side child join or a probe-side child join of the given level is a bushy join.

12. The method of claim 5, wherein:

operand metadata are defined at one or more scans of one or more base tables, all join levels of the multi-level join reference the operand metadata at the one or more base tables, and any modification to a given operand is visible to all join levels of the multi-level join.

13. One or more non-transitory storage media storing instructions which, when executed by one or more computing devices, cause:

executing a join operation, wherein:

executing the join operation comprises:

decomposing the join operation into a set of opcodes; and pipelining execution of the set of opcodes, the set of opcodes is a minimal set of opcodes that fully describe the join operation, and join operand metadata is shared across the set of opcodes, the set of opcodes includes one or more primary opcodes comprising at least one of:

a primary build opcode for building columns of a build-side row source at a given join level of the join operation into a data structure, a primary probe opcode that uses a key column of a probe-side row source at the given join level to probe the data structure for matches, a primary materialize opcode that materializes a join result at the given join level, or a primary distribute opcode that distributes the join result at the given join level across multiple processes for parallelization.

14. The one or more non-transitory storage media of claim 13, wherein the join operation is a multi-level join involving a plurality of join operations on more than two tables.

15. The one or more non-transitory storage media of claim 14, wherein pipelining execution of the set of opcodes comprises:

providing output of a first opcode in a given level of the multi-level join to a second opcode in a higher level of the multi-level join, wherein the higher level is not an immediate parent level of the given level.

16. The one or more non-transitory storage media of claim 14, wherein:
pipelining execution of the join operation comprises pipelining the multi-level join as a right-deep join wherein a result of each join feeds a probe side of its parent join, and
the right-deep join comprises:
a build phase comprising a primary build opcode that builds a key-value table for a build-side row source per level, and
multi-probe phase comprising a primary probe opcode that uses a key column of a probe-side row source to probe the key-value table of each join level, in order, starting with a leaf level join of the multi-level join.

17. The one or more non-transitory storage media of claim 14, wherein:
pipelining execution of the join operation comprises pipelining the multi-level join as a left-deep join wherein a result of each join feeds a build side of its parent join, the left-deep join comprises:
a transpose opcode for a join key of a build-side row source of a leaf-level join in the multi-level join,
a sequence of probe-build phases at each given non-root level of the multi-level join comprising a key-value-build opcode for the given non-root level, a transpose opcode for columns of a probe-side table of the given non-root level, a key-value-probe opcode to generate probe results for the given non-root level, and
a probe phase at a root level of the multi-level join comprising a key-value build opcode for a root-level join and a key-value-probe opcode to generate a final probe result for the root-level join.

18. The one or more non-transitory storage media of claim 14, wherein:
pipelining execution of the join operation comprises pipelining a given level of the multi-level join as a bushy join, wherein a probe-side child join of the given level is a left-deep join or a right-deep join, and
the multi-level join comprises an additional probe opcode on a probe-side of the probe-side child join for the bushy join.

19. The one or more non-transitory storage media of claim 14, wherein:
pipelining execution of the join operation comprises pipelining a given level of the multi-level join as a bushy join, wherein a build-side child join of the given level is a left-deep join or a right-deep join, and
the multi-level join comprises an additional materialize opcode on a probe-side of the build-side child join for the bushy join.

20. The one or more non-transitory storage media of claim 13, wherein each of the one or more primary opcodes is decomposed into one or more secondary opcodes selected from the group consisting of:
a transpose opcode,
a hash opcode,
a partition opcode,
a key-value-build opcode,
a gather opcode,
a key-value-probe opcode, and
a project opcode.

* * * * *